Figure 1:
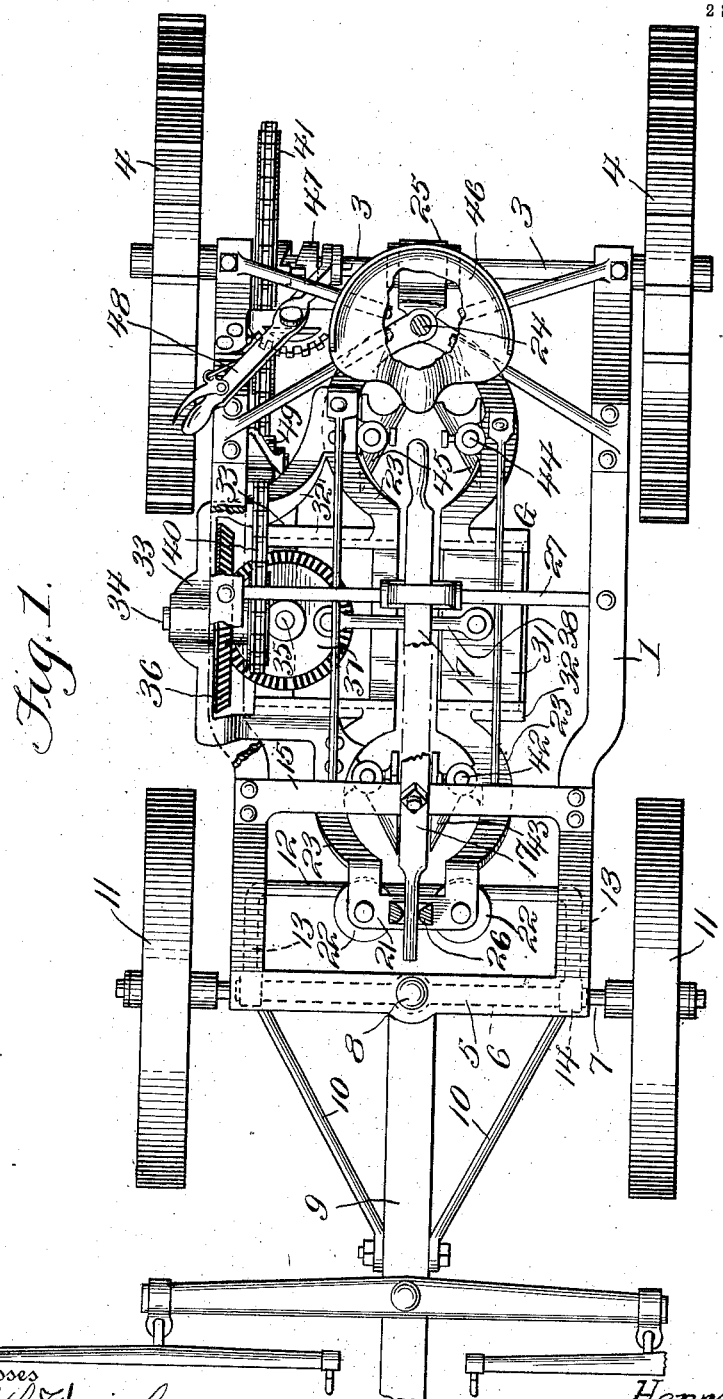

H. C. BICKERS.
COTTON CHOPPER AND CULTIVATOR.
APPLICATION FILED MAY 13, 1911.

1,016,733.

Patented Feb. 6, 1912.

2 SHEETS—SHEET 1.

Witnesses
J. L. Wright,
Wm. Bagger

Inventor
Henry C. Bickers
By Victor J. Evans,
Attorney

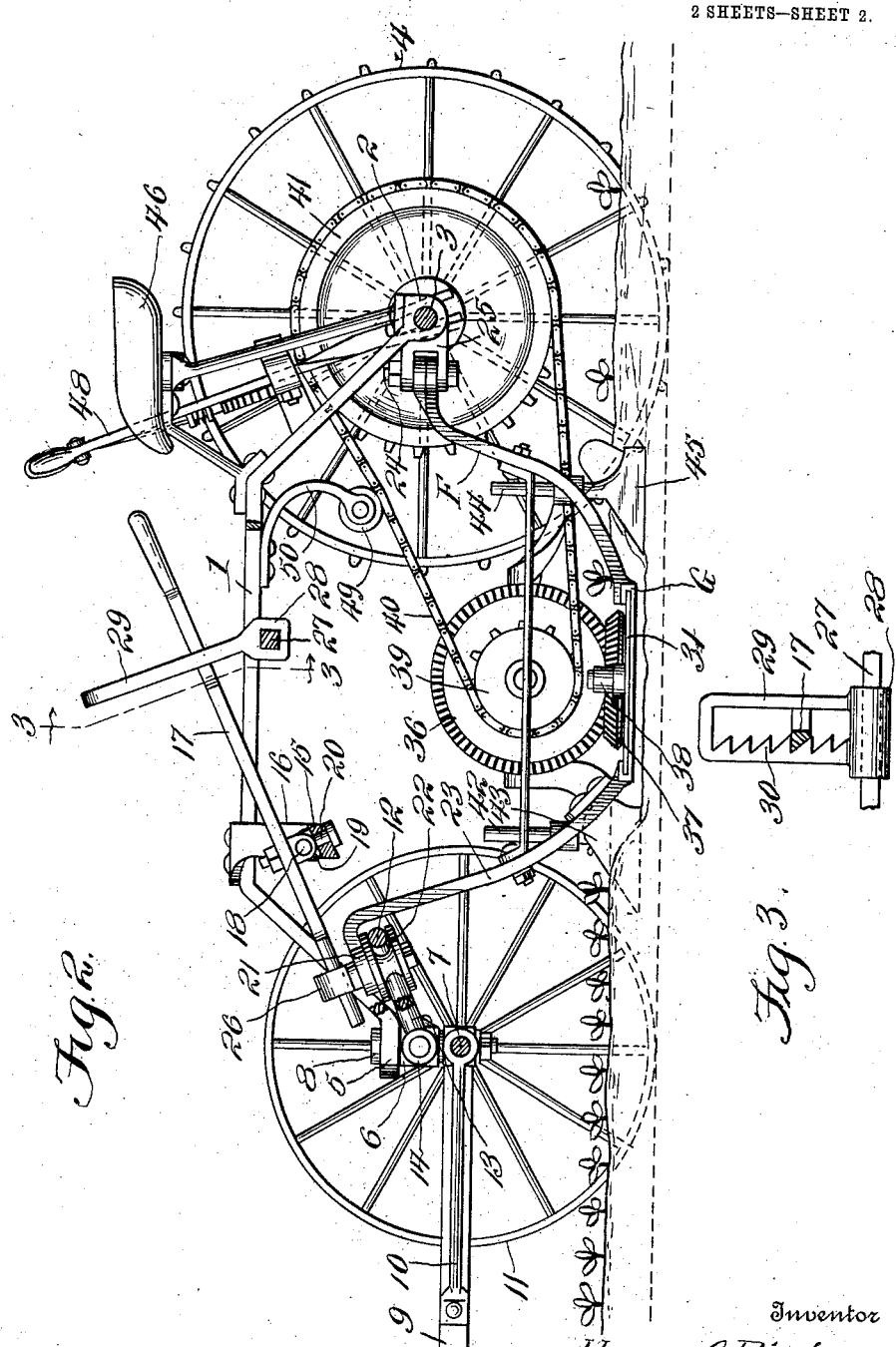

UNITED STATES PATENT OFFICE.

HENRY C. BICKERS, OF BATESVILLE, ARKANSAS.

COTTON CHOPPER AND CULTIVATOR.

1,016,733.  Specification of Letters Patent.  Patented Feb. 6, 1912.

Application filed May 13, 1911. Serial No. 626,889.

*To all whom it may concern:*

Be it known that I, HENRY C. BICKERS, a citizen of the United States, residing at Batesville, in the county of Independence and State of Arkansas, have invented new and useful Improvements in Cotton Choppers and Cultivators, of which the following is a specification.

This invention relates to cotton choppers and cultivators, and it has for its object to produce a simple and efficient machine or implement for working cotton and similar crops to scrape or bar off the rows, to chop out the plants and to move the dirt toward the plants, thereby leaving the crop in the best condition to promote successful and vigorous growth.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a machine constructed in accordance with the invention. Fig. 2 is a sectional side elevation. Fig. 3 is a sectional detail view taken on the plane indicated by the line 3—3 in Fig. 2.

Corresponding parts in the several figures are denoted by like characters of reference.

The frame of the machine comprises longitudinally disposed arched side members 1, 1, the rear ends of which are provided with sleeves 2 affording bearings for the rear axle 3 having the wheels 4. The forward ends of the side members 1 are connected by a cross piece 5 resting upon a bolster 6 which is supported upon the front axle 7, the said axle, bolster and cross bar being connected together by a king bolt 8. Draft members, such as a tongue 9, and hound bars 10, extend forwardly from the front axle, and the latter carries transporting wheels 11.

A transversely disposed guide rail 12 is provided with forwardly extending arms 13 having terminal sleeves or cuffs 14 which are journaled upon the ends of the bolster 6. A cross bar 15 suitably associated with the main frame, the side members of which may be provided with brackets 16 supporting said cross bar, carries a lever 17 which is fulcrumed upon a pin 18 supported in an approximately horizontal plane by means of a lug 19 having an approximately vertical pivot 20 engaging the cross bar 15 with which the lever 17 is thus connected for universal movement.

An adjustable frame F is provided, the same consisting of side members 23 connected at their front ends by a cross bar 21 upon which grooved wheels 22 are journaled, said wheels engaging the guide rail 12. The rear ends of the side members 23 are connected by an approximately vertical pivot 24 with a sleeve or collar 25 upon the rear axle. The cross bar 21 of the frame F is provided with an upwardly extending member 26 for the passage of the front end of the lever 17, and it will be seen that by manipulating said lever the forward end of the frame F may be moved up and down in an approximately vertical plane, the frame including the guide rail and the arms 13 rocking upon the bolster when such adjustment is effected, and the wheels or rollers 22 being grooved to a sufficient depth to retain them in engagement with the guide rail while such adjustment is effected. By rocking the lever 17 about the axis of the pin 20, the forward end of the frame F may be adjusted laterally, the grooved rollers 22 traveling upon the guide rail 12, while the forward end of the lever loosely engages the eye 26, the depth of the grooves in the rollers 22 being sufficient to permit this lateral adjustment. A non-circular cross bar 27 upon the main frame carries a laterally movable sleeve or collar 28 provided with an upright frame 29 through which the lever 17 extends and one side of which constitutes a rack bar 30 which may be engaged by said lever for the purpose of retaining the latter at any desired adjustment, it being obvious that when the lever is moved to effect lateral adjustment of the frame F, the sleeve 28 will slide freely upon the bar 27.

The frame F composed of the side members 23 is arched downwardly between the front and rear axles, and it carries a horizontal frame G wherein a reciprocatory knife or cutter 31 is guided. The frame G is composed of two separate parts or sections 32 and 32', one of said sections being associated with each side bar 23 of the frame F, the said parts or sections as well as the side bars of the frame being sufficiently spaced to admit of the passage therebetween of the row of plants that is to be operated upon. Brackets 33 are also provided, affording supports for shafts 34, 35 carrying intermeshing bevel gears 36, 37, which latter is connected by a pitman 38 with the knife or chopping member 31, which latter may thus be reciprocated. The shaft 34 carrying the bevel gear 36 also carries a sprocket wheel 39 which is connected by a chain 40 with a sprocket wheel 41 upon the rear axle from which motion will be transmitted to the cutting or chopping mechanism. The side members 23 of the cutter carrying frame also serve to support shanks 42 carrying scrapers 43 and shanks 44 carrying dirt-engaging blades 45 to move the dirt toward the growing plants. A suitably supported seat 46 is provided for the driver or operator, and a clutch 47 of conventional construction and adapted to be actuated by a lever 48 is also provided to enable the cutting mechanism to be thrown into and out of gear, as may be required. A chain tightening roller 49 is provided to engage the chain 40, said roller being mounted upon a suitably supported resilient arm 50.

From the foregoing description, taken in connection with the drawings hereto annexed, it will be readily seen that as the machine progresses over the ground the row of plants will be barred off, chopped out, and the dirt will be thrown toward the plants, thus leaving said plants in the best possible condition. The cutter carrying frame is capable of being vertically adjusted to cause the cutter to operate at the desired depth, and the lateral adjustability of the said frame F enables the cutting apparatus to be guided according to any crookedness or inequalities in the row.

Having thus described the invention, what is claimed as new, is:—

1. In a machine of the character described, a frame structure including front and rear axles and a bolster supported upon the front axle, a guide rail having arms provided with sleeves journaled upon the bolster, an auxiliary tool carrying frame equipped with guide rollers engaging the guide rail, said frame being movably connected with the rear axle, and means for effecting adjustment of the tool carrying frame.

2. In a device of the character described, a frame structure including front and rear axles and a bolster supported upon the front axle, a guide rail having arms pivotally engaging the bolster, a laterally adjustable frame equipped with rollers engaging the guide rail, said frame being also movably connected with the rear axle, means for effecting adjustment of the frame, and a cotton chopping device carried by the frame.

3. In a machine of the character described, a frame structure including front and rear axles and a bolster supported upon the front axle, a guide rail having arms pivotally engaging the bolster, a downwardly arched cutter carrying frame comprising side members and a front cross bar, a sleeve mounted upon the rear axle with which the side bars of the cutter carrying frame are pivotally connected, grooved rollers upon the front cross bar engaging the guide rail, a universally movable lever supported upon the main frame, and an eye member rising from the front cross bar of the cutter carrying frame and engaged by said lever.

4. In a machine of the character described, a main frame structure including front and rear axles, a bolster supported upon the front axle, side members having sleeves engaging the rear axle, and a front cross bar supported upon the bolster and associated with the side members, a guide rail having arms pivotally engaging the bolster, a sleeve supported upon the rear axle, a cutter carrying frame including side members pivotally connected with said sleeve and a front cross bar, grooved rollers upon said cross bar engaging the guide rail, and lever means for effecting lateral and vertical adjustment of the front end of the cutter carrying frame.

In testimony whereof I affix my signature in presence of two witnesses.

HENRY C. BICKERS.

Witnesses:
W. H. L. WOODYARD,
H. A. BICKERS.

---

Copies of this patent may be obtained for five cents each, by addressing the "Commissioner of Patents, Washington, D. C."